United States Patent [19]
Beech

[11] Patent Number: 5,629,742
[45] Date of Patent: May 13, 1997

[54] COMPATIBLE NON LINEAR PRE-EMPHASIS FOR COMPOSITE VIDEO SIGNALS

[75] Inventor: Brian H. Beech, Bishopstoke, England

[73] Assignee: National Transcommunications, Ltd., Hampshire, England

[21] Appl. No.: 78,168

[22] PCT Filed: Dec. 20, 1991

[86] PCT No.: PCT/GB91/02288

§ 371 Date: Jun. 22, 1993

§ 102(e) Date: Jun. 22, 1993

[87] PCT Pub. No.: WO92/11732

PCT Pub. Date: Jul. 9, 1992

[30] Foreign Application Priority Data

Dec. 20, 1990 [GB] United Kingdom ............ 9027598

[51] Int. Cl.$^6$ ............... H04N 5/21; H04N 5/217
[52] U.S. Cl. ............ 348/613; 348/609; 348/612
[58] Field of Search ............ 348/613, 608, 348/607, 609, 612, 624, 640, 639, 641, 470, 645, 711, 708; 375/350, 296, 285, 254; 455/63; H04N 5/21, 5/213, 5/38, 5/49

[56] References Cited

U.S. PATENT DOCUMENTS

| | | | |
|---|---|---|---|
| 3,286,024 | 11/1966 | Melchlor | 348/607 |
| 3,365,541 | 1/1968 | Melchlor | 348/607 |
| 4,684,983 | 8/1987 | Acampora | 358/135 |
| 4,922,331 | 5/1990 | Ezaki | 348/609 |
| 5,027,210 | 6/1991 | Beech | 348/613 |
| 5,225,910 | 7/1993 | Sugimori et al. | 348/613 |

FOREIGN PATENT DOCUMENTS

| | | | |
|---|---|---|---|
| 2157909 | 10/1985 | United Kingdom | H04N 5/21 |
| WO88/07800 | 10/1988 | WIPO | H04N 5/21 |

*Primary Examiner*—John K. Peng
*Assistant Examiner*—John W. Miller
*Attorney, Agent, or Firm*—Watson Cole Stevens Davis PLLC

[57] ABSTRACT

When a video signal including a component modulated onto a subcarrier (such as a PAL signal) is subjected to a non-linear pre-emphasis known for MAC signals, with the object of reducing the effects of noise encountered in transmitting the composite signal through an f.m. channel, problems of noise and differential gain remain. These problems are overcome by subjecting the composite signal to a filtering step, before application of the non-linear processing, so as to filter out the subcarrier, the chrominance subcarrier in a PAL signal, and to compand the chrominance sidebands. Preferably a notch filter is used which has a notch shaped as a Gaussian curve.

15 Claims, 7 Drawing Sheets

COMPATIBLE NON LINEAR PRE-EMPHASIS FOR COMPOSITE VIDEO SIGNALS

BACKGROUND OF THE INVENTION

1. Field of the Invention

When PAL or other similar subcarrier based video signals are transmitted through a satellite or other f.m. channel, the resulting chrominance signal to noise ratio is generally less than the luminance signal to noise ratio. This arises because of the triangular noise spectrum which results in high noise density around the colour subcarrier frequency (see FIG. 1).

This invention relates to a method for applying non linear pre-emphasis and de-emphasis in such a way that both the luminance and chrominance signal to noise ratios can be improved. The sensitivity of the signal to interference is also improved by the application of this technique.

2. Prior Art

Non linear pre/de-emphasis has been developed for MAC packet family signals. See, for example the E7 technique described in EBU Technical Document 3258. The signal is split into two frequency bands using high pass and low pass filters. The high frequency components are subjected to a non linear processing and then re-combined with the un-modified low frequency components. FIG. 2a shows de-emphasis circuit configurations which require only one filter. The complementary filter is produced by subtraction of the low pass or high pass filter output from the input signal. The non linearity, N, is generally of the form shown in FIG. 2b, which may be expressed by the following equation:

$$V_o = V e^{(q/KTM)(V_i - V_0)} - V e^{-(q/KTM)(V_i - V_0)}$$

where
$V_o$=voltage output from transfer function
$V_i$=voltage input to transfer function
T=absolute temperature
K=Boltzmann's constant
q=charge on the electron
and V and M are shape factors.

When the complementary non-linear pre-emphasis technique (using similar filters $F_1$ or $F_2$, and a non-linear function $N^{-1}$) is used on a signal, the effect is to boost the level of low level signals occurring at high frequencies, leaving high level signals at these frequencies substantially unaffected. If the pre-emphasised signal passes through an f.m. channel noise will disproportionately affect the high frequencies in the signal, as mentioned above. When the signal is subsequently de-emphasised the noise affecting low level signals at high frequency will be reduced in level along with the low level signals. The noise affecting high level signals at high frequency is not altered.

If such a technique is applied to a signal including a subcarrier, such as a PAL signal, the absence of a noise improvement for high level high frequency signals is a significant problem for the signal modulating the subcarrier, e.g. the chrominance signal. This is because the noise affecting high level high frequency luminance is masked by the high frequency variation of the signal itself, whereas the chrominance signal is at high frequencies because of its modulation on a subcarrier, rather than because of intrinsic high frequency variation occurring in the chrominance, and so when colour saturation is high (i.e. for high level chrominance) there will not be a masking effect to hide the noise.

A second problem is that the effect of the pre-emphasis network would be to produce large amounts of differential gain, i.e. the gain would vary depending on the chrominance subcarrier level. Conventional receivers cannot adjust to gain changes which are level dependent and so a subcarrier based signal pre-emphasised in the known manner would not be compatible with conventional receivers. Receivers not equipped with the de-emphasis circuit would display a seriously impaired picture.

One way of overcoming these problems would be to apply non-linear pre-emphasis to the YUV components before PAL coding. The de-emphasis would be applied to the YUV components after de-coding. This has the problem that three circuits are required in the receiver. Additionally, these signals may not be available in the receiver. It is the object of this invention to provide a non linear de-emphasis which can be implemented using a single circuit applied to a composite waveform, e.g. PAL signal, in such a way that it can provide both luminance and chrominance noise improvement, preferably in a compatible way so that existing receivers not employing the de-emphasis circuitry will produce an essentially unimpaired picture.

SUMMARY OF THE INVENTION

The present invention provides a method for pre-emphasising a video signal comprising a first component and a second component, the second component being modulated onto a subcarrier, the method comprising the steps of:

a) filtering the high frequency portion of the video signal to attenuate the signal over a range of frequencies including the subcarrier frequency, the filtering being adapted to attenuate the signal at the subcarrier frequency substantially to zero; and b) applying a non-linear processing to the filtered high frequency portion of the video signal.

The present invention further provides a method for de-emphasising a video signal received from an f.m. channel, the method comprising the steps of:

a) f.m. demodulating the received signal to produce a received video signal comprising a first component and a second component, the second component being modulated onto a subcarrier;

b) filtering the high frequency portion of the received video signal to attenuate the signal over a range of frequencies including the subcarrier frequency, the filtering being adapted to attenuate the signal at the subcarrier frequency substantially to zero; and c) applying a non-linear processing to the filtered high frequency portion of the received video signal.

The present invention still further provides apparatus for pre-emphasising a video signal comprising a first component and a second component, the second component being modulated onto a subcarrier, the apparatus comprising:

a notch filter for filtering the high frequency portion of the video signal, the filter being adapted to attenuate the signal at the subcarrier frequency substantially to zero; and means for applying a non-linear processing to the filtered high frequency portion of the video signal.

The present invention yet further provides apparatus for de-emphasising a video signal received from an f.m. channel, comprising:

means for f.m. demodulating the received signal to produce a received video signal comprising a first component and a second component, the second component being modulated onto a subcarrier;

a notch filter arranged to operate on the high frequency portion of the received video signal, the filter being adapted to attenuate the signal at the subcarrier frequency substantially to zero; and means for applying a non-linear processing to the filtered high frequency portion of the received video signal.

BRIEF DESCRIPTION OF THE DRAWINGS

Further features and advantages of the present invention will become clear from the following description of embodiments thereof, given by way of example, and illustrated in the accompanying drawings, in which:

FIG. 2b illustrates the transfer function of the non-linear function N used in the de-emphasis configurations of FIG. 2a;

DETAILED DESCRIPTION

Figure 1:
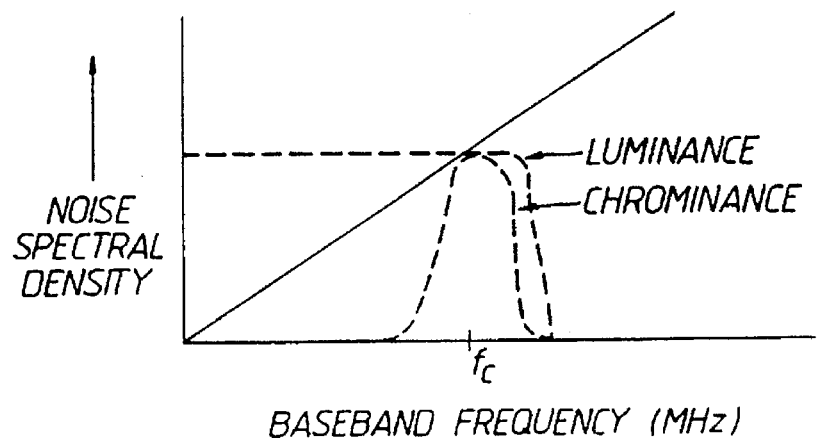
FIG. 1 shows the noise spectrum of an f.m. channel.
Figure 2A:
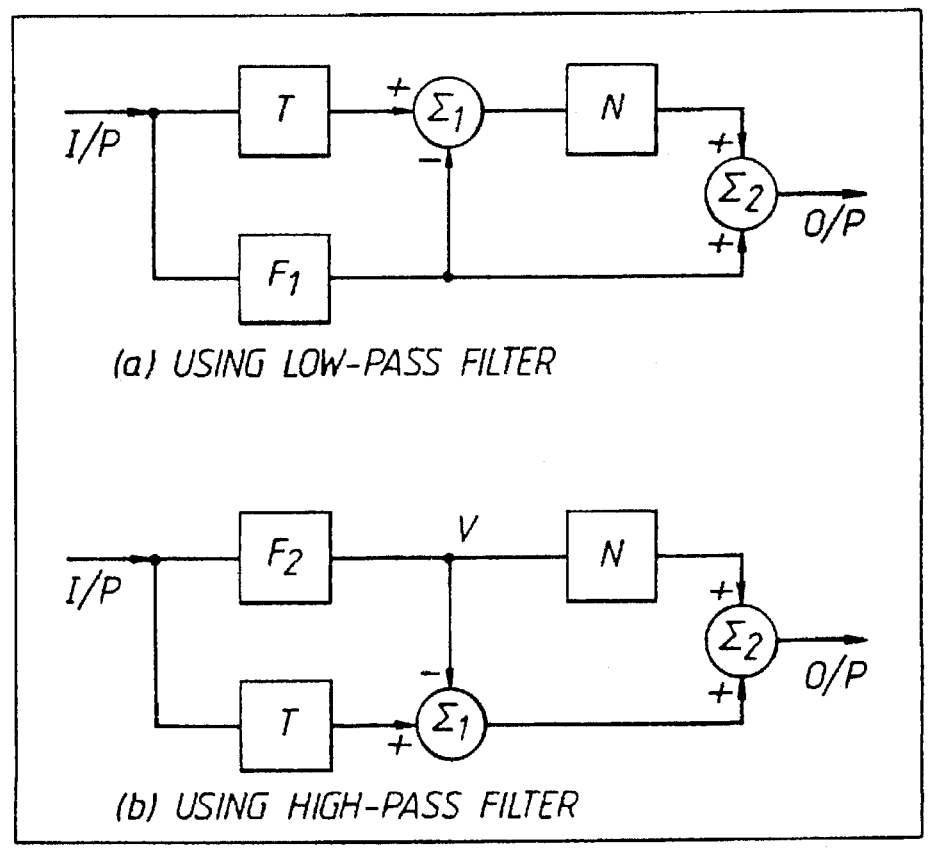
FIG. 2a shows known configurations for performing a non-linear de-emphasis.
Figure 3:
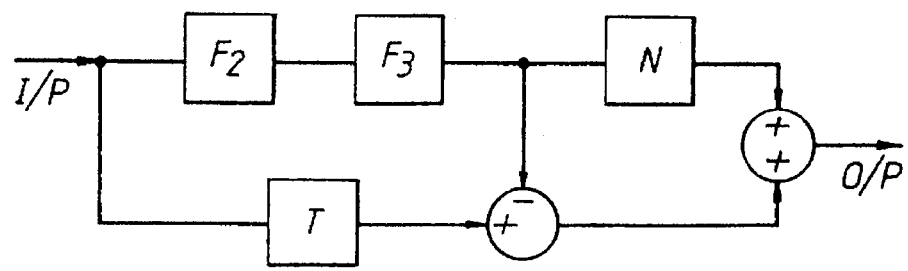
FIG. 3 illustrates in block diagrammatic form a first embodiment of non-linear de-emphasis configuration according to the invention for use with a PAL signal.
Figure 4:
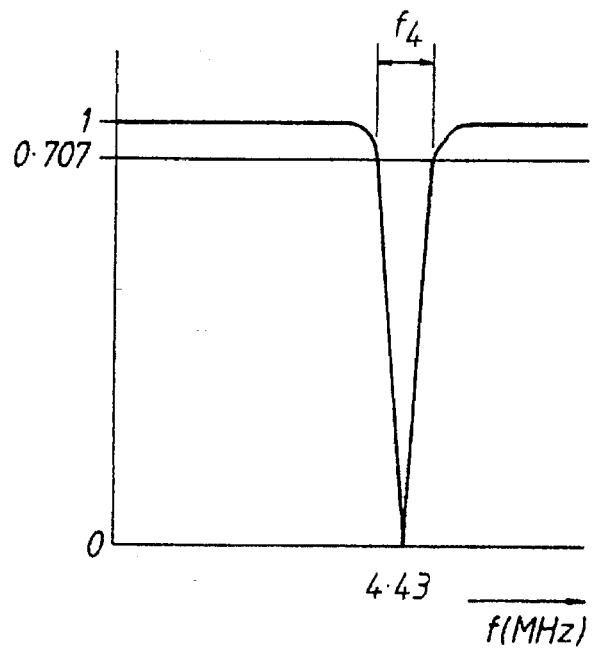
FIG. 4 illustrates the frequency response of the filter $F_3$ of FIG. 3.

FIG. 3 shows a block diagram for non-linear de-emphasis according to the invention. The new feature is the addition of the filter function $F_3$. The form of the frequency response of $F_3$ is shown in FIG. 4. The gain at chrominance centre frequency is essentially zero. The filter has a −3dB bandwidth $F_4$, and this value and also the shape of the notch are important in determining the noise improvement to the chrominance signal, and in determining the level of compatibility. The principle here is to compand the chrominance sidebands in a weighted fashion such that no companding is applied to the chrominance centre frequency.

It is desirable that the notch should be narrow in relation to the chrominance bandwidth and noise performance improves as the notch narrows. However use of a very narrow notch leads to compatibility problems and also to the introduction into the signals of a noise modulation.

The shape of the notch should be symmetrical and the cut-off should not be too sharp or else compatibility problems arise. Current test results suggest that a notch shape similar to a Gaussian curve gives particularly beneficial results.

Figure 5:
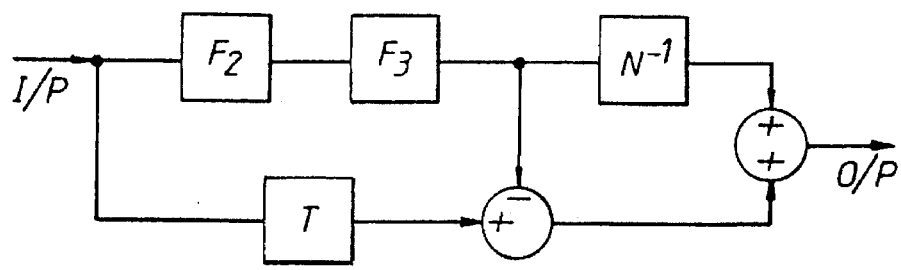
FIG. 5 illustrates in block diagrammatic form a first embodiment of non-linear pre-emphasis configuration complementary to the de-emphasis configuration of FIG. 3.
Figure 2B:
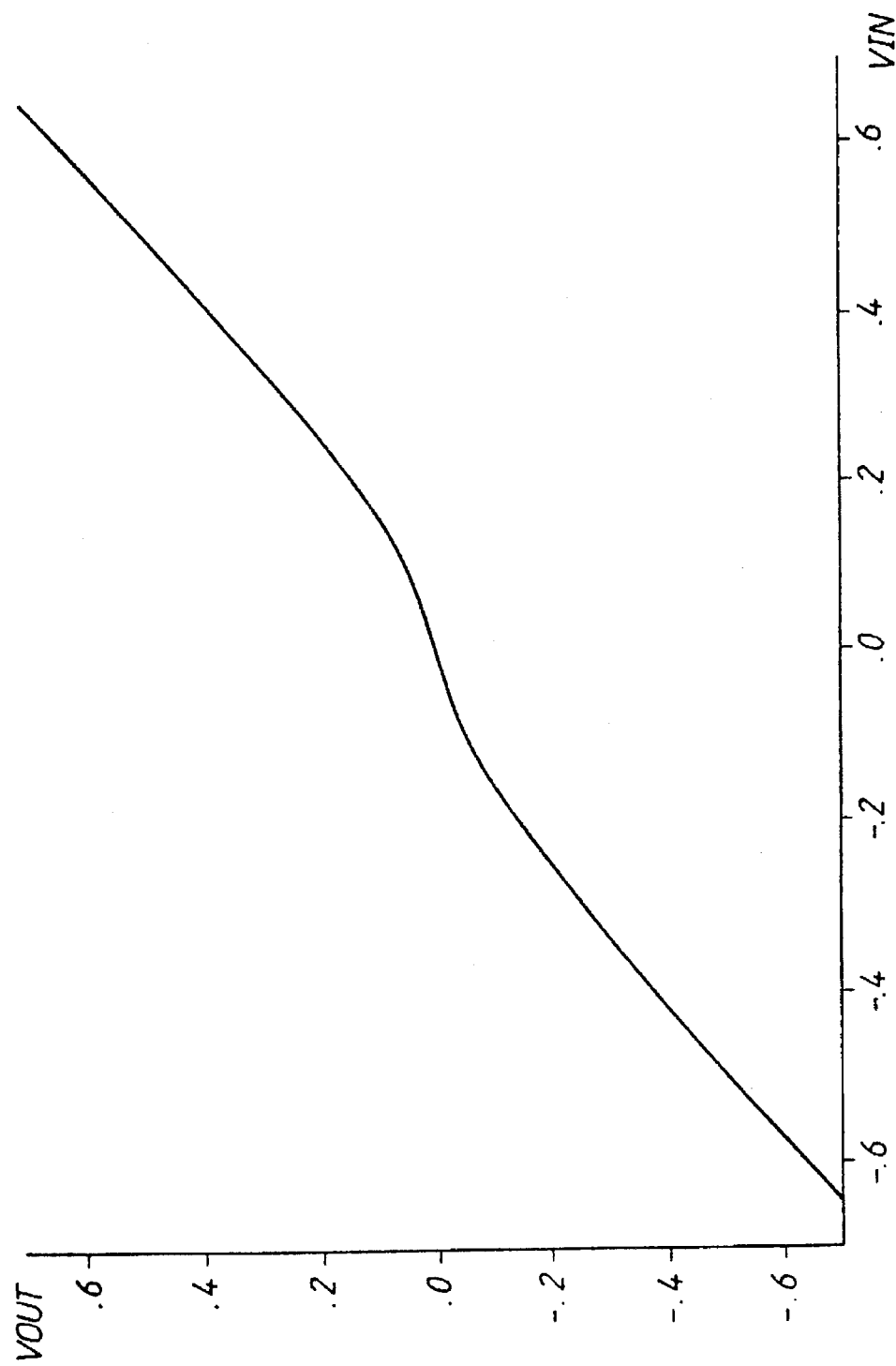
Figure 6:
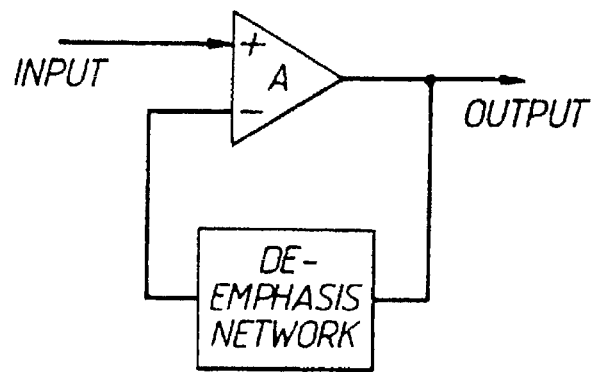
FIG. 6 illustrates an analogue second embodiment of pre-emphasis configuration according to the invention.

This processing may be applied either in analogue form or in digital form. A basic pre-emphasis configuration is shown in FIG. 5. This is the same as the de-emphasis but with the non linearity N replaced by the complementary function $N^{-1}$. This network only represents an approximation to the true complement of the de-emphasis network. FIG. 6 shows an accurate way of implementing the pre-emphasis network when this is done in analogue form.

Figure 7:
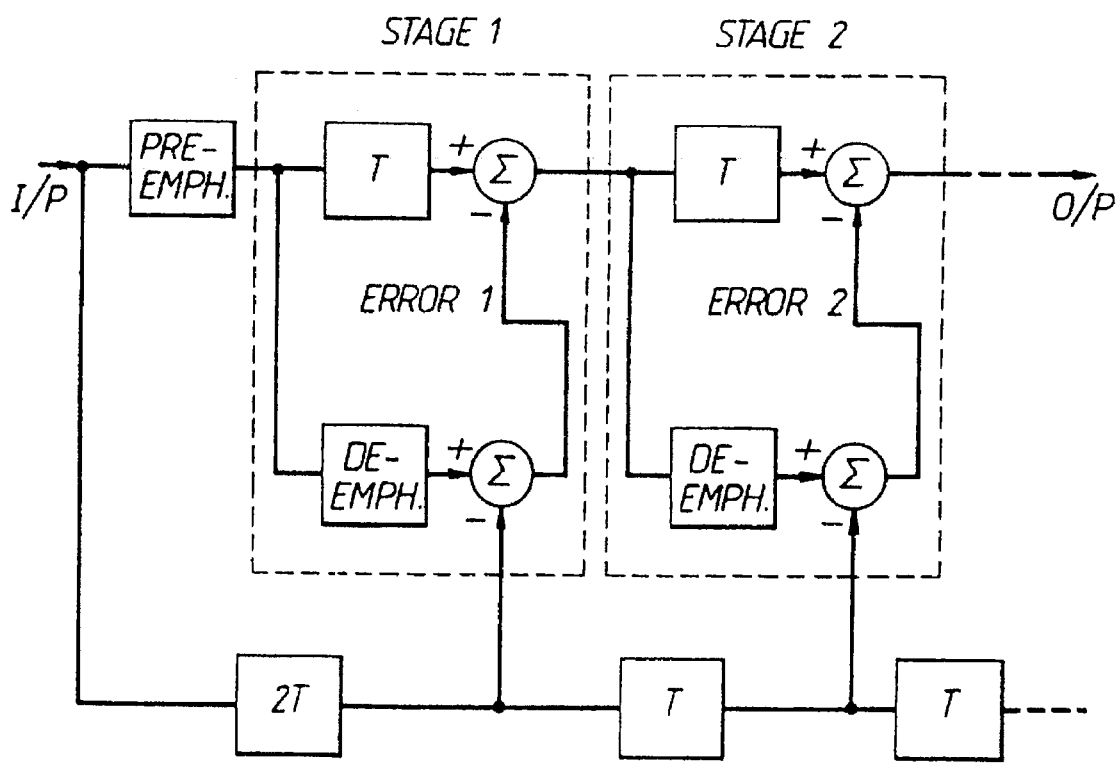
FIG. 7 shows in block diagrammatic form a third embodiment of pre-emphasis configuration according to the invention using feed-forward pre-correction.

When digital implementation is used, feed forward pre-correction can be used at the transmitter as shown in FIG. 7. A first approximation to the pre-emphasised signal is made by using the configuration of FIG. 5. Within the building blocks (indicated by the broken lines), the signal is de-emphasised by a de-emphasis network and an error signal developed by subtracting the original signal. The error signal is subtracted from the last estimation of the required pre-emphasised signal in order to provide a new estimation. By repeating this process it is possible to provide convergence of the error towards zero.

Figure 8:
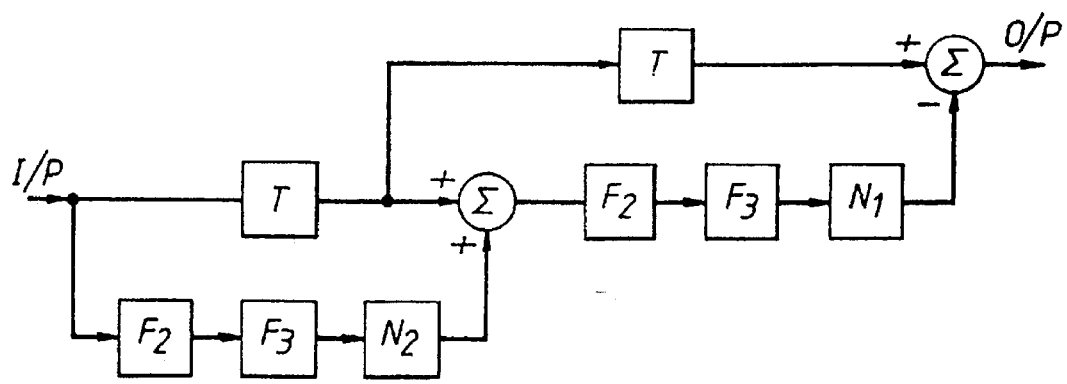
FIG. 8 shows a simplified version of the pre-emphasis configuration of FIG. 7.

FIG. 8 shows a pre-emphasis configuration which implements the function of the block diagram of FIG. 7 for one stage of feed forward correction. Evidently the configuration of FIG. 8 can be extended to any number of pre-correction stages and the accuracy of the pre-emphasis network can be made as high as desired by this means. This configuration is ideally suited to digital implementation.

Comparing FIG. 8 to the basic pre-emphasis configuration of FIG. 5, the non-linearities $N_1$, $N_2$ are related to the non-linearity $N^{-1}$ by the following relations.

$$N_1(V_i) = N(V_i) - V_i$$

$$N_2(V_i) = N^{-1}(V_i) - V_i$$

where the output $V_o$ of a non-linearity N is related to its input $V_i$ by the relation $V_o = N(V_i)$. The delays T shown in the block diagrams are padding delays to compensate for the delays through filters $F_2$, $F_3$.

It is an object of preferred embodiments of the invention to provide a compatible pre-emphasis, so that a receiver not employing a de-emphasis network will produce an acceptable picture quality. The degree of compatibility depends partly on the choice of non-linear function N, the choice of which in turn depends on the filter $F_2$, $F_3$ and on the filtering which will be present in the receiver between the FM demodulator and the de-emphasis network.

It has been shown that in order to achieve optimum compatibility, it is necessary to design the overall filtering in order to minimise the absolute magnitude of the noise at the input to the non-linear function N (FIG. 3). Additionally it is necessary to minimise the signal level at this point which may arise due to the presence of sound subcarriers.

Figure 9A:
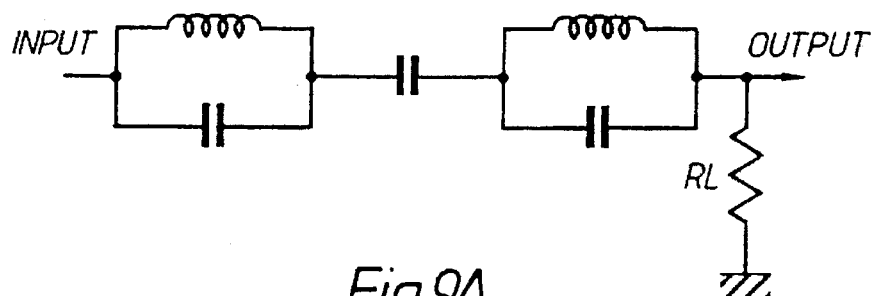
FIG. 9a is a circuit diagram illustrating an embodiment of combined filter, embodying filters $F_2$ and $F_3$ and a sound sub-carrier rejection filter, for a receiver.
Figure 10:
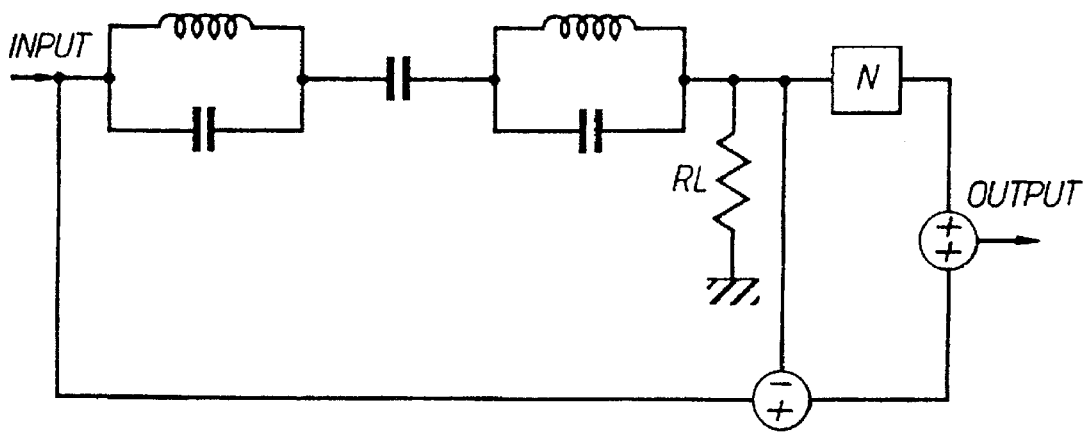
FIG. 10 is a diagram illustrating a second embodiment of de-emphasis apparatus according to the invention.
Figure 9B:
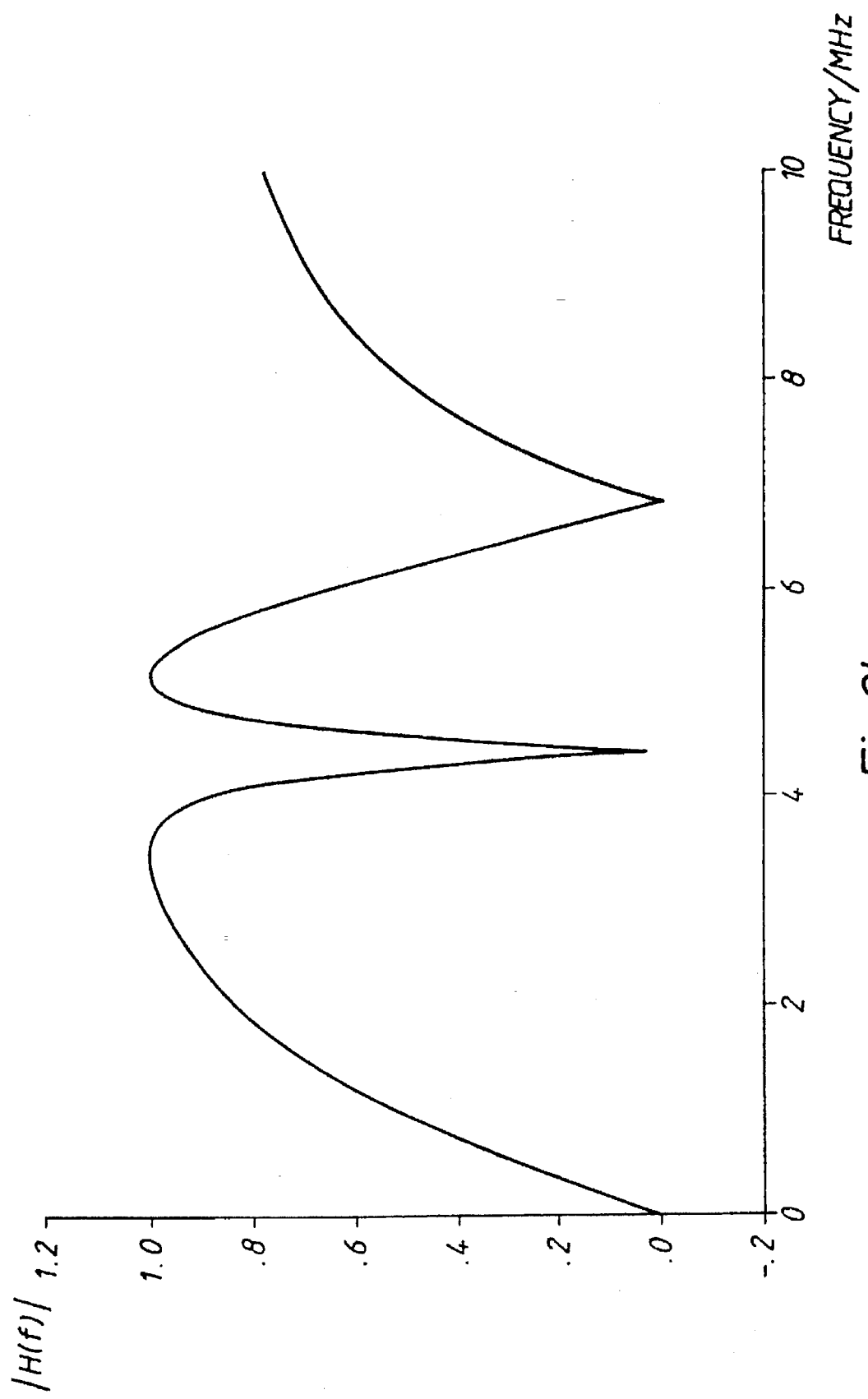
FIG. 9b illustrates the frequency response of the filter of FIG. 9a with component values suitable for a PAL signal.

For application in low cost receivers it is advantageous to combine filters $F_2$, $F_3$ and a sound subcarrier rejection filter into one filter. One embodiment of this approach is the filter shown in FIG. 9a. The frequency response of such a filter, designed for use on a PAL signal, is shown in FIG. 9b. This filter has the special property that it can achieve a frequency response which is symmetrical about chrominance subcarrier. Additionally, the delay at chrominance subcarrier frequency is zero. An example of the use of this filter in an analogue de-emphasis network is shown in FIG. 10. The de-emphasis function so produced is such that if pre-emphasis implementation is achieved by the feedback method of FIG. 6, then the feedback loop is in principle a stable loop.

Digital implementation of pre- and de-emphasis using FIR filtering will result in a linear phase characteristic, and this provides the best possible compatibility. The filter $F_3$ has a bandwidth which will be small compared with the system sampling rate, and this will require a filter with a large number of taps, typically 50 taps or more. This will apply if $F_2$ and $F_3$ are implemented as two filters or if they are combined into one filter implementation.

For low cost receiver implementation, an alternative filtering function $F_3$ can be used. Firstly the digital sampling rate is chosen to be a multiple of the chrominance subcarrier frequency Fsc. Out of the total number of filter coefficients, the number of active coefficients is reduced by forcing the intermediate coefficients to zero. This results in a frequency response which is a comb filter. As an example, consider a comb filter with a sampling rate of 4× fsc with active coefficients as follows:

$C(-24) = -0.125$ $C(-12) = -0.25$ $C(0) = 0.75$ $C(12) = -0.25$ $C(24) = -0.125$

Figure 11:
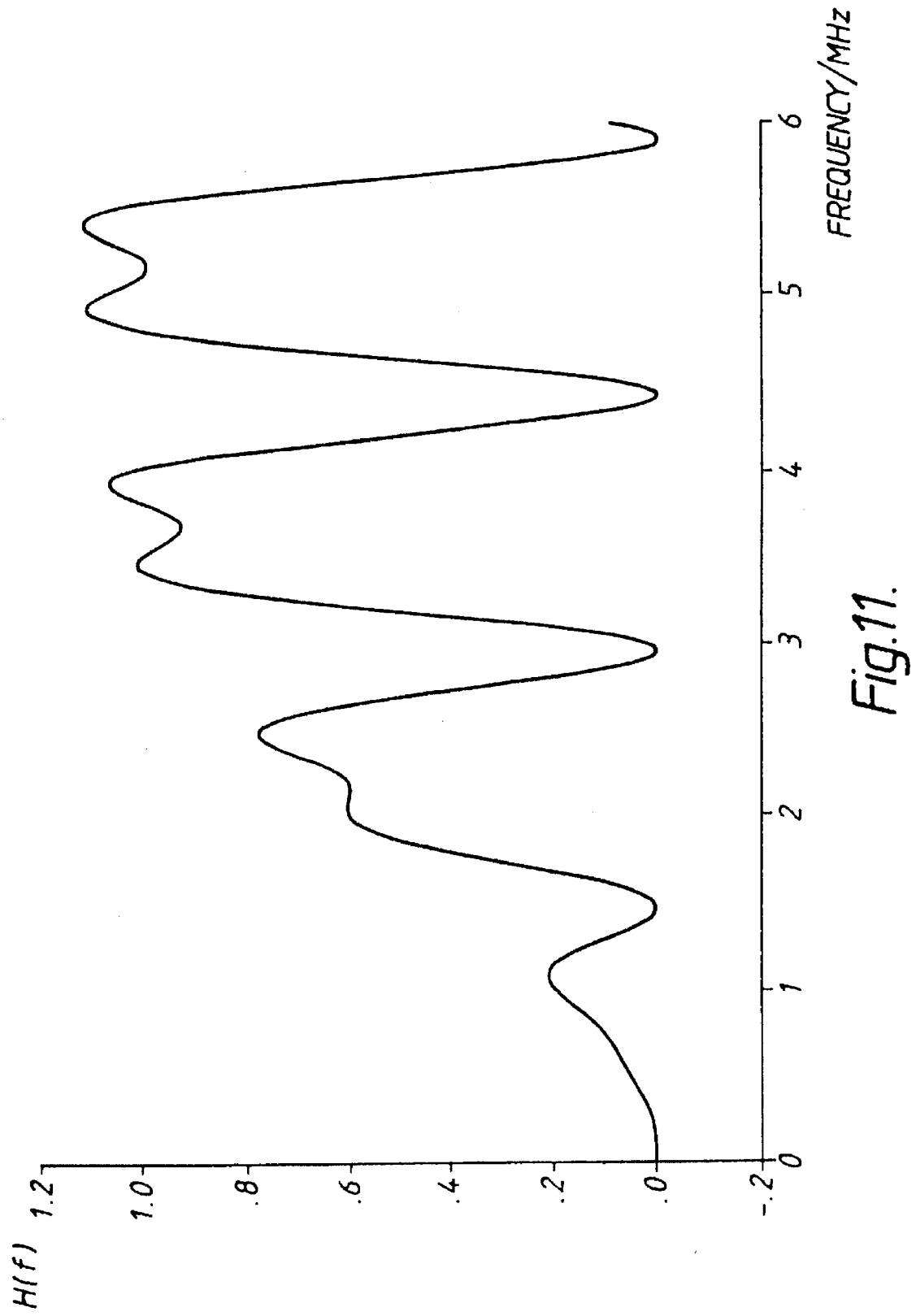
FIG. 11 illustrates the frequency response of a cascade of filters $F_2$ and $F_3$ for a low cost receiver implementation.

Filter $F_2$ is a high pass filter which might typically have a Gaussian response and only requires few filter taps. The overall form of the frequency response of the cascade of such filters $F_2$, $F_3$ is shown in FIG. 11. In addition to the required filtering around the chrominance subcarrier frequency, this has two unwanted nulls within the passband, at about 1.5 and 3 MHz. However, these nulls are of no consequence if the filtering in the pre-emphasis network is the same as in the de-emphasis. Also it has been shown that in this case the compatible picture quality is not degraded significantly by the presence of the nulls.

Alternatively, if the pre-emphasis network includes the ideal filtering and the de-emphasis network has comb filtering, then the quality of the de-emphasised picture is not degraded significantly. This approach allows the first receivers to employ comb filtering, and as technology advances, the later receivers can employ ideal filtering.

Non-linear pre- and de-emphasis implementations have been described for both analogue and digital techniques. If compatibility is not a requirement, then the degree of noise improvement possible is not limited by this factor. The invention has been described in relation to PAL signals but evidently it can be applied to NTSC or other subcarrier based systems.

I claim:

1. A method for pre-emphasising a video signal comprising a first component and a second component, the second component being modulated onto a subcarrier, the method comprising the steps of:

a) filtering the high frequency portion of the video signal to attenuate the signal over a range of frequencies including the subcarrier frequency, the filtering attenuating the signal at the subcarrier frequency substantially to zero;

b) applying a non-linear processing to the filtered high frequency portion of the video signal to produce a first pre-emphasised signal;

c) applying a non-linear de-emphasis to the first pre-emphasised signal to produce a reconstructed signal, the transfer function of the applied de-emphasis being inverse to that of the desired pre-emphasis;

d) comparing the reconstructed signal with the input video signal to produce a first error signal; and e) subtracting the first error signal from the pre-emphasised signal to produce a closer approximation to the desired pre-emphasised signal.

2. A video signal pre-emphasis method according to claim 1, wherein the range of frequencies at which the signal is attenuated in the filtering step is narrow compared with the bandwidth of the second component of the video signal.

3. A video signal pre-emphasis method according to claim 1, wherein the filtering step comprises passing the high frequency portion of the video signal through a notch filter having a notch shaped as a Gaussian curve.

4. A video signal pre-emphasis method according to claim 1, and further comprising the steps of:

filtering the high frequency portion of the pre-emphasised signal to attenuate the signal at the subcarrier frequency substantially to zero, applying a further non-linear processing to the filtered high frequency portion of the pre-emphasised signal, and subtracting the processed signal from the input video signal to produce a closer approximation to the desired pre-emphasised signal.

5. A video signal pre-emphasis method according to claim 4, wherein the further non-linear processing step comprises applying a transfer function $N_1$ which may be expressed by the equation:

$$N_1(V_i) = N(V_i) - V_i$$

the function N being expressed by the following equation:

$$V_o = Ve^{(q/kTM)(V_i - V_0)} - Ve^{-(q/kTM)(V_i - V_0)}$$

where $V_o$ = voltage output from the transfer function N;

$V_i$ = voltage input to the transfer function N;

T = absolute temperature;

k = Boltzmann's constant;

q = charge on the electron; and

V and M = shape factors.

6. A video signal pre-emphasis method according to claim 1, wherein the transfer function of the applied non-linear processing step is the inverse of a function N, function N being represented by the following equation:

$$V_o = Ve^{(q/kTM)(V_i - V_0)} - Ve^{-(q/kTM)(V_i - V_0)}$$

where $V_o$ = voltage output from the transfer function N;

$V_i$ = voltage input to the transfer function N;

T = absolute temperature;

k = Boltzmann's constant;

q = charge on the electron; and

V and M = shape factors.

7. A video signal pre-emphasis method according to claim 1 further comprising the step of repeating steps c–e.

8. A video signal pre-emphasis method according to claim 1, further comprising de-emphasising the video signal by the steps of:

fm demodulating the input signal to produce a received video signal comprising a first component and a second component, the second component being modulated onto a subcarrier;

filtering the high frequency portion of the received video signal to attenuate the signal over a range of frequencies including the subcarrier frequency, the filtering attenuating the signal at the subcarrier frequency substantially to zero; and applying a non-linear processing to the filtered high frequency portion of the received video signal.

9. Apparatus for pre-emphasising a video signal comprising a first component and a second component, the second component being modulated onto a subcarrier, the apparatus comprising:

- a notch filter for filtering the high frequency portion of the video signal, the filter attenuating the signal at the subcarrier frequency substantially to zero;
- means for applying a non-linear processing to the filtered high frequency portion of the video portion of the video signal to produce a first pre-emphasised signal;
- means for applying a non-linear de-emphasis to the pre-emphasised signal to produce a reconstructed signal, the transfer function of the applied de-emphasis being inverse to that of the desired pre-emphasis,
- means for comparing the reconstructed signal with the input video signal to produce a first error signal, and
- means for subtracting the first error signal from the pre-emphasised signal to produce a closer approximation to the desired pre-emphasised signal.

10. Video signal pre-emphasis apparatus according to claim 9, wherein the bandwidth of the notch of the notch filter is narrow compared with the bandwidth of the second component of the video signal.

11. Video signal pre-emphasis apparatus according to claim 9, wherein the notch filter has a notch shaped as a Gaussian curve.

12. Video signal pre-emphasis apparatus according to claim 9, and further comprising:

- a further notch filter for filtering the high frequency portion of the pre-emphasised signal to attenuate the signal at the subcarrier frequency substantially to zero,
- means for applying a further non-linear processing to the filtered high frequency portion of the pre-emphasised signal, and
- means for subtracting the processed signal from the input video signal to produce a closer approximation to the desired pre-emphasised signal.

13. Video signal pre-emphasis apparatus according to claim 12, wherein the means for applying a further non-linear processing step is adapted to apply a transfer function $N_1$ which may be expressed by the equation:

$$N_1(V_i) = N(V_i) - V_i$$

the function N being represented by the following equation:

$$V_o = V e^{(q/kTM)(V_i - V_o)} - V e^{-(q/kTM)(V_i - V_o)}$$

where $V_o$ = voltage output from the transfer function N;
$V_i$ = voltage input to the transfer function N;
T = absolute temperature;
k = Boltzmann's constant;
q = charge on the electron; and
V and M = shape factors.

14. Video signal pre-emphasis apparatus according to claim 9, wherein the transfer function of the applied pre-emphasis is the inverse of a function N, function N being represented by the following equation:

where $$V_o = V e^{(q/kTM)(V_i - V_o)} - V e^{-(q/kTM)(V_i - V_o)}$$

$V_o$ = voltage output from the transfer function N;
$V_i$ = voltage input to the transfer function N;
T = absolute temperature;
k = Boltzmann's constant;
q = charge on the electron; and
V and M = shape factors.

15. Apparatus for pre-emphasising a video signal according to claim 9, further comprising means for causing the repetitive operation of said means for applying a non-linear de-emphasis, means for comparing and means for subtracting.

* * * * *